March 31, 1970  T. J. COCHRAN ET AL  3,503,272

POSITIONING APPARATUS

Filed May 27, 1968  2 Sheets-Sheet 1

INVENTORS
THOMAS J. COCHRAN
JOSEPH C. FORMICHELLI

BY Frank C. Leach Jr.

ATTORNEY

United States Patent Office 3,503,272
Patented Mar. 31, 1970

1

3,503,272
POSITIONING APPARATUS
Thomas J. Cochran, Lighthouse Point, Fla., and Joseph C. Formichelli, Fishkill, N.Y., assignors to International Business Machines Corporation, Armonk, N.Y., a corporation of New York
Filed May 27, 1968, Ser. No. 732,290
Int. Cl. F16h *21/58*
U.S. Cl. 74—89.15                               14 Claims

ABSTRACT OF THE DISCLOSURE

A positioning apparatus includes a plurality of members movable relative to each other along two axial directions and about an axis of rotation. Through utilizing a single adjusting means acting on the upper member along a single axis, an element clamped to the upper member may be positioned about the axis of rotation and along the two axial directions.

---

The need for precise positioning of a small object with respect to a reference position is well known, particularly in the semiconductor field. For example, a substrate must be properly positioned with respect to a reference position in order for the substrate to be properly conditioned. Thus, it is necessary for the object to be capable of movement in two axial directions and about an axis of rotation to produce the desired movement of the object. Because of the relatively small or miniature size of the object, it is necessary to control very minute amounts of movement.

The positioning of a relatively small or miniature object along two different axes and about an axis of rotation has previously been suggested. However, in the prior positioning apparatuses, it has been necessary to utilize separate adjusting means for moving the object in each of the desired directions. This has resulted in a positioning apparatus of a relatively large size. Furthermore, in the previously suggested apparatuses, the possibility has existed of the operator grasping the wrong adjusting means.

The present invention satisfactorily overcomes the foregoing problem by utilizing a single adjusting means for moving the object, which is to be positioned, along the two different axes and about the axis of rotation. Thus, the present invention provides an apparatus, which is relatively small in comparison with the previously available apparatuses because of the utilization of only a single adjusting means or mechanism. With the use of the single adjusting means of the present invention, the operator will not grasp the wrong adjusting mechanism or means as is possible with the positioning apparatuses in which three separate adjusting means are employed.

Since substrates in the semiconductor field are of a miniature size so that a microscope may be necessary to observe the positioning of the substrate with respect to the reference position, the present invention permits the operator to be able to position the substrate by utilizing on hand while employing the other hand for any necessary control of the microscope. Thus, it is not necessary for the operator to have to ascertain if the correct adjusting mechanism or means has been grasped since there is only the single adjusting means.

Additionally, the use of the single adjusting means permits a more simplified construction than is available with the previously suggested positioning apparatuses in which three adjusting means are employed. Thus, the cost of the positioning apparatus of the present invention is of relatively low cost in comparison with the previously suggested apparatuses.

2

In some previously suggested positioning apparatuses, various movable portions of the apparatus have required support by fluid bearings. The use of fluid bearings not only increases the cost of the positioning apparatus but also increases its size.

The present invention eliminates the foregoing problem by not requiring any bearing structure between the various movable members. Accordingly, this also permits the positioning apparatus of the present invention to be smaller than the previously suggested positioning apparatuses and to be of lower cost.

An object of this invention is to provide a positioning apparatus in which only a single adjusting means is employed to move a support element in a plurality of directions.

Another object of this invention is to provide an apparatus for positioning a supported element through movement in three directions.

The foregoing and other objects, features, and advantages of the invention will be more apparent from the following more particular description of a preferred embodiment of the invention as illustrated in the accompanying drawings.

Figure 1:
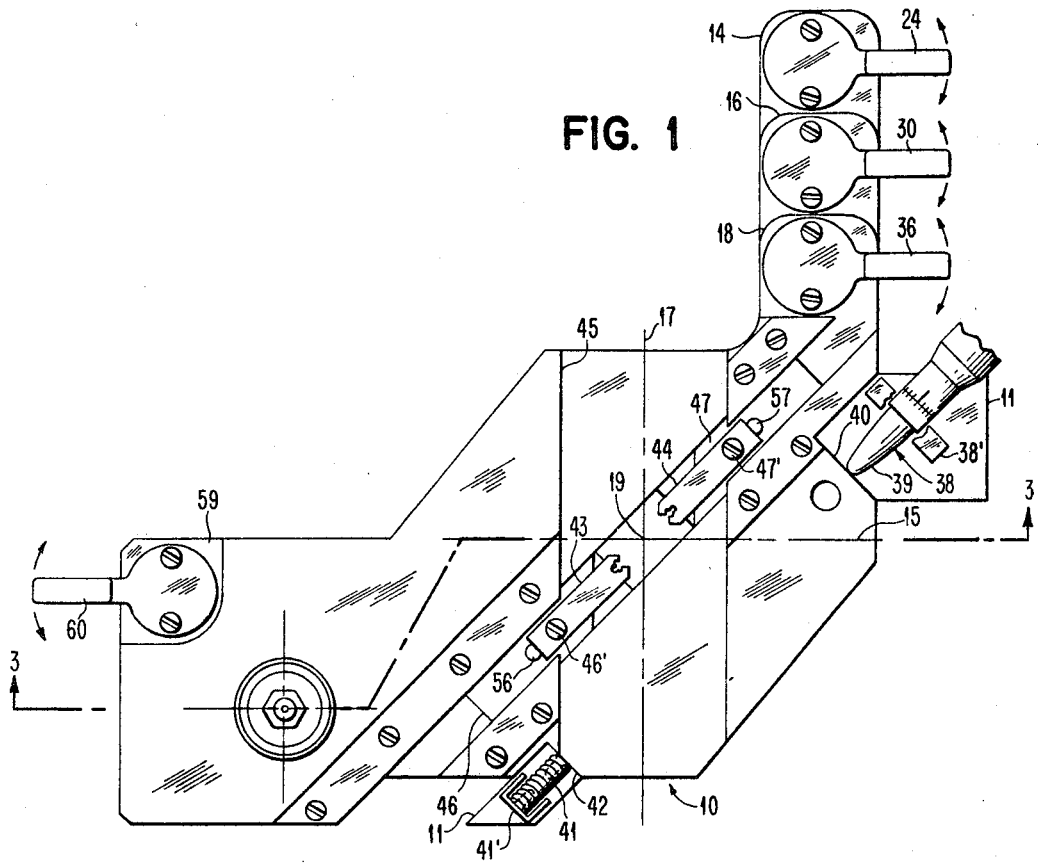
FIG. 1 is a top plan view of the positioning apparatus of the present invention without an object supported thereon.

Referring to the drawings, there is shown a positioning apparatus 10. The positioning apparatus 10 includes a base 11 (see FIG. 2), which is fixedly secured to other support structure (not shown), having means 12 disposed on the base 11 for movement relative to the base 11. The means 12 supports an object on its uppermost surface for positioning with respect to a reference position.

The support means 12 includes a bottom member 14, which is slidably mounted on the base 11 for movement relative thereto along an axis 15 (see FIG. 1). The support means 12 includes an intermediate or second member 16, which is mounted on the top surface of the bottom member 14 for movement along a second axis 17 (see FIG. 1). The support means 12 also includes a third or upper member 18, which is mounted on the intermediate member 16 for rotation in a circular direction about an axis 19 of rotation (see FIGS. 1 and 3).

As shown in FIG. 1, the axes 15 and 17 are substantially perpendicular to each other and intersect at the axis 19 of rotation. However, it should be understood that the axes 15 and 17 do not need to be perpendicular to each other nor do they even need to intersect for the present invention to position an element or object supported on the upper member 18 at a reference position. Furthermore, the axis 19 of rotation need not be disposed at the intersection of the axes 15 and 17.

The bottom surface of the bottom member 14 of the support means 12 has a longitudinal slot 20 (see FIG. 2) formed therein for reception of an upstanding, longitudinal key or way 21 on the base 11. The slot 20 has its longitudinal axis disposed along the axis 15 so that the movement of the bottom member 14 relative to the way 21 on the base 11 is in the direction of the axis 15.

A lock screw 22 has its reduced portion extending through an enlarged hole 23 in the bottom member 14. The lower end of the reduced portion of the lock screw 22 is threaded for reception within a threaded opening in the upper surface of the base 11. The lock screw 22 has a handle 24 fixedly secured to its top surface for actuation of the lock screw 22. When the head of the lock screw 22 abuts against the top surface of the bottom member 14, the bottom member 14 is locked or clamped against movement relative to the base 11.

Figure 3:
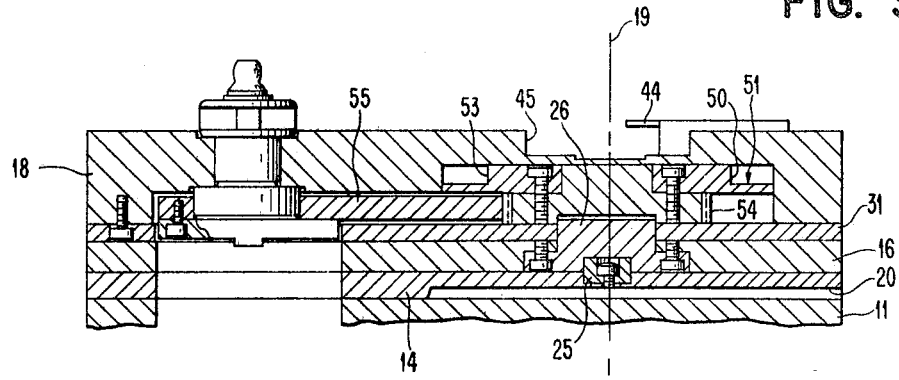
FIG. 3 is a sectional view of the positioning apparatus of FIG. 1 and taken along line 3—3 of FIG. 1.

As shown in FIG. 3, the bottom member 14 has a key or way 25 secured thereto and extending above its upper surface. The key or way 25 cooperates with a longitudinal slot in the bottom surface of the intermediate member 16. The axes of the slot and the way 25 are disposed along the same longitudinal axis as the axis 17.

The slot in the bottom surface of the intermediate member 16 is formed in both the bottom surface of the intermediate member 16 and in a circular member 26, which is supported by the intermediate member 16 adjacent the intersection of the axes 15 and 17 by being fixedly secured thereto. As a result, the intermediate member 16 may move along the axis 17 relative to the bottom member 14 and the base 11.

Figure 2:
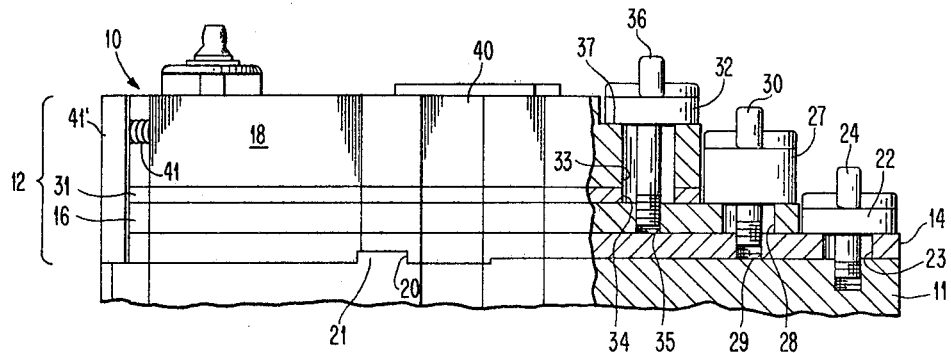
FIG. 2 is a side elevational view, partly in section, of the positioning apparatus of FIG. 1 and taken from the right hand side of FIG. 1 with the adjusting means omitted for clarity purposes.

As shown in FIG. 2, a lock screw 27 has its reduced portion extending through an enlarged hole 28 in the intermediate member 16. The lower end of the reduced portion of the lock screw 27 is threaded for reception in a threaded opening 29 in the bottom member 14. As a result, when the lock screw 27 is turned by a handle 30, which is fixedly secured to the upper surface of the lock screw 27, the enlarged head of the lock screw 27 abuts against the upper surface of the intermediate member 16 to lock or clamp the intermediate member 16 to the bottom member 14. Therefore, the intermediate member 16 may be moved along the axis 17 only when the lock screw 27 does not have the intermediate member 16 locked or clamped to the bottom member 14.

As shown in FIG. 3, the circular member 26 protrudes upwardly above the upper surface of the intermediate member 16 to rotatably support the upper member 18 for rotation about the axis 19 of rotation relative to the intermediate member 16. The upper member 18 has a member 31 fixedly secured to its lower surface. The member 31 has a circular opening to receive the upper portion of the circular member 26 whereby the upper member 18 is rotatably supported on the circular member 26 by the member 31.

As shown in FIG. 2, a lock screw 32 has its reduced portion extending through an enlarged hole 33 in the member 18 and a similar and aligned enlarged hole 34 in the member 31. The lock screw 32 has the lower end of its reduced portion threaded for disposition in a threaded opening 35 in the intermediate member 16. When the lock screw 32 is turned by a handle 36, which is fixedly secured to the upper surface of the head of the lock screw 32, the lock screw 32 is threaded into the opening 35 until the head of the lock screw 32 engages against a surface 37 on the member 18. The surface 37 is parallel to the upper surface of the upper member 18. When the lock screw 32 has its head clamped against the surface 37, no rotation of the member 18 about the axis 19 of rotation can occur. However, when the handle 36 turns the lock screw 32 in a direction to release the head of the lock screw 32 from engaging the surface 37 of the member 18, the upper member 18 may be rotated about the axis 19 of rotation.

An adjusting means 38 (see FIG. 1), which may be a micrometer, for example, is supported on the base 11 by a support 38' and has a portion 39 engaging a surface 40 on the upper member 18. The surface 40 is disposed at an angle, preferably 45°, to both of the axes 15 and 17. As a result, the adjusting means 38 exerts a force in a direction that is at an angle to both of the axes 15 and 17 and does not pass through the axis 19 of rotation.

With the surface 40 at an angle of 45° to both of the axes 15 and 17, the maximum mechanical advantage is obtained. At this angle of 45°, the adjusting means 38 could be calibrated to indicate the magnitude of motion along either of the axes 15 or 17.

A spring 41 is mounted on the base 11 by a support 41' and is adapted to engage a surface 42 on the upper member 18. The surface 42 is disposed parallel to the surface 40. Accordingly, by appropriately disposing the spring 41, the force of the spring 41 is transmitted along the same axis as the axis of the adjusting means 38 so that the force of the spring 41 is at an angle to both of the axes 15 and 17 disposed at a distance from the axis 19 of rotation.

The substrate or other element, which is to be positioned by the positioning apparatus 10 of the present invention, is supported on the upper member 18 by a pair of oppositely disposed arms 43 and 44. The arms 43 and 44 extend into a slot 45, which is formed in the upper surface of the upper member 18 to receive the various substrates as they would be moved along the longitudinal axis of the slot 45 during an automatic operation. The longitudinal axis of the slot 45 is the axis 17.

The arm 43 is supported on a slider 46 while the arm 44 is disposed on a slider 47. The sliders 46 and 47 are disposed in oppositely aligned slots in the upper surface of the upper member 18. The arm 43 is fixedly secured to the slider 46 by a screw 46' while the arm 44 is fixedly secured to the slider 47 by a screw 47'.

Figure 4:
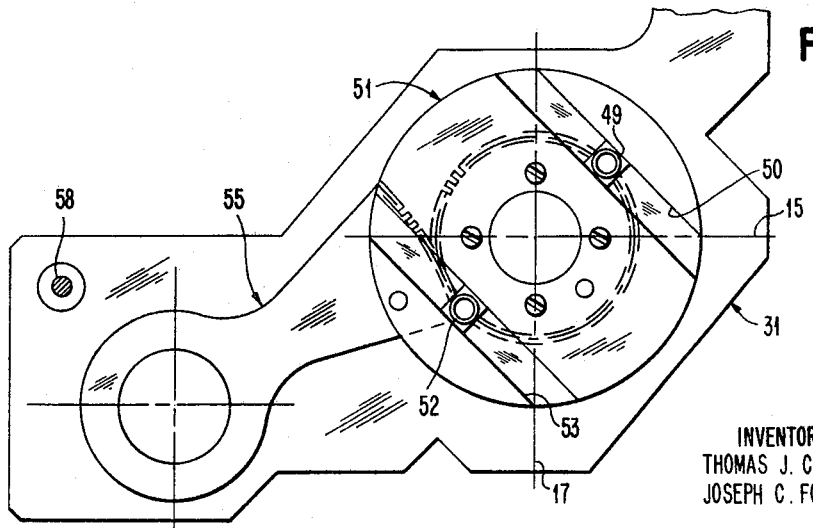
FIG. 4 is a top plan view of a portion of the positioning apparatus of FIG. 1 with the uppermost member of the positioning apparatus of FIG. 1 removed.
Figure 5:
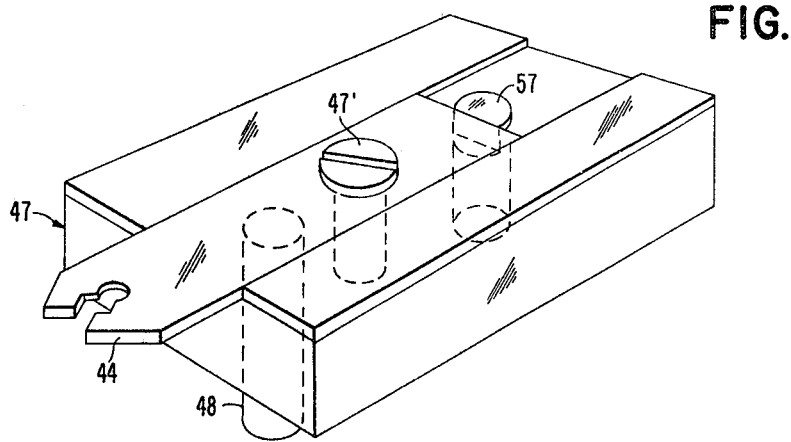
FIG. 5 is an enlarged perspective view showing a portion of the clamping means for retaining the object, which is to be positioned, on the positioning apparatus of the present invention.

As shown in FIG. 5, the slider 47 has a downwardly extending pin 48 for disposition in a cylindrical member 49 (see FIG. 4), which is slidably disposed within a slot 50 in an annular member 51. The slider 46 is similarly connected to a hollow cylindrical member 52 in a slot 53 in the annular member 51; the slots 50 and 53 are parallel to each other.

The annular member 51 has a gear 54 attached thereto and cooperating with a rack 55, which is pivotally mounted on the upper member 18. The rack 55 is adapted to be actuated by suitable mechanism (not shown) to rotate the gear 54 whereby the annular member 51 is rotated. As a result, the arms 43 and 44 are moved toward each other to clamp the substrate therebetween and away from each other to release the clamped substrate. The movement of the arms 43 and 44 away from each other is limited by stop pins 56 and 57, respectively, in the sliders 46 and 47, respectively.

A lock screw 58 extends through enlarged holes in the members 18, 31, 16, and 14 and has its lower threaded end engaged in a threaded opening in the base 11. The head of the lock screw 58 bears against a surface 59 (see FIG. 1) on the upper member 18. The surface 59 is disposed beneath the upper surface of the upper member 18 but parallel thereto. When a handle 60, which is fixedly secured to the head of the lock screw 58, is turned, the head of the lock screw 58 abuts against the surface 59 of the upper member 18 to lock or clamp all of the members 18, 31, 16, and 14 to the base 11. This insures that there is no accidental movement of any of the members relative to each other.

Considering the operation of the present invention, a substrate or other element, which is to be positioned by the positioning apparatus 10 of the present invention, is held or retained between the clamping arms 43 and 44. This disposes the substrate so that its center is at the intersection of the axes 15 and 17 and the axis 19 of rotation.

If it is necessary to rotate the substrate about the axis 19 of rotation, the handle 60 is turned to unlock the members 18, 31, 16, and 14 from the base 11. Then, the handle 36 is turned to release the head of the lock screw 32 from engagement with the surface 37 of the upper member 18. As a result, the upper member 18 may be rotated about the axis 19 of rotation relative to the intermediate member 16. Since the intermediate member 16 is clamped to the member 14 by the lock screw 27 and the bottom member 14 is clamped to the base 11 by the lock screw 22, only the upper member 18 can rotate.

With the upper member 18 free to rotate about the axis 19 of rotation, movement of the portion 39 of the adjusting means 38 against the force of the spring 41 causes clockwise (as viewed in FIG. 1) rotation of the member 18, which has the substrate clamped thereto by the clamping arms 43 and 44, about the axis 19 of rotation. If it is desired to rotate the substrate in the opposite direction, then the portion 39 of the adjusting means 38 is moved away from the surface 40. Since the force of the spring 41 maintains the surface 40 of the upper member 18 in engagement with the portion 39 of the adjusting means 38, the upper member 18 rotates counterclockwise (as viewed in FIG. 1) about the axis 19 of rotation.

Upon completion of rotation, the handle 36 is turned to again cause the head of the lock screw 32 to engage the surface 37 of the upper member 18 to lock the upper member 18 to the intermediate member 16. If no further positioning of the substrate is necessary, then the handle 60 would be turned to cause the lock screw 58 to lock the members 18, 31, 16, and 14 to the base 11.

However, if further adjustment is necessary and such will be assumed, then the handle 30 is turned to release the head of the locking screw 27 from engagement with the upper surface of the intermediate member 16. As a result, the intermediate member 16 may be moved relative to the bottom member 14 along the axis 17. Since the upper member 18 is clamped to the intermediate member 16 by the lock screw 32, the movement of the portion 39 of the adjusting means 38 causes movement of both the upper member 18 and the intermediate member 16 along the axis 17.

If the portion 39 of the adjusting means 38 is turned to move the portion 39 toward the surface 40, the substrate on the upper surface of the upper member 18 is moved toward the front (as viewed in FIG. 1) of the positioning apparatus 10. If the adjusting means 38 is rotated in the opposite direction to retract the portion 39 away from the surface 40 whereby the spring 41 exerts the moving force, then the substrate on the upper surface of the upper member 18 is moved toward the back (as viewed in FIG. 1) of the positioning apparatus 10.

Then, the handle 30 is again rotated to cause the head of the lock screw 27 to engage against the upper surface of the intermediate member 16 to clamp the intermediate member 16 to the bottom member 14. If no further movement is required to properly position the substrate at the reference position, then the handle 60 is turned to cause the lock screw 58 to lock the members 18, 31, 16, and 14 to the base 11.

However, it will be assumed that a further adjustment is necessary in a direction along the axis 15. As a result, the handle 24 is turned to remove the head of the lock screw 22 from engagement with the upper surface of the bottom member 14. As a result, the bottom member 14 may be moved relative to the base 11. Since the lock screw 27 locks the intermediate member 16 to the bottom member 14 and the lock screw 32 locks the upper member 18 to the intermediate member 16, the upper member 18, which has the substrate thereon, is moved whenever the bottom member 14 is moved relative to the base 11.

Accordingly, with the lock screw 22 no longer clamping the bottom member 14 to the base 11, rotation of the portion 39 of the adjusting means 38 toward the surface 40 of the upper member 18 results in movement of the upper member 18 to the left (as viewed in FIG. 1). If the portion 39 of the adjusting means 38 is rotated away from the surface 40 of the upper member 18, the spring 41 causes the surface 40 to follow the portion 39 of the adjusting means 38 to move the upper member 18 to the right (as viewed in FIG. 1) along the axis 15.

When the substrate on the upper member 18 has been moved along the axis 15 to the desired position, the handle 24 is turned to cause the lock screw 22 to have its head engage the upper surface of the bottom member 14 to clamp the bottom member 14 to the base 11. Then, the handle 60 is turned to cuase the lock screw 58 to have its head moved against the surface 59 on the upper member 18 to clamp the members 18, 31, 16, and 14 to the base 11.

While the present invention has been described with respect to positioning an element in both a circular direction and in two axial directions, it should be understood that the present invention could be utilized for only positioning in two axial directions. Furthermore, if more than two axial directions were required, this also could be accomplished with the present invention whether there was movement in the circular direction or not. It is only necessary to insure that the direction of the applied force is not through the axis of rotation.

While the element to be positioned has been described as being supported on the upper member 18, it should be understood that it could be supported on the intermediate member 16 or the bottom member 14. In such an arrangement, it would be necessary for the adjusting means 38 and the spring 41 to act on the member having the element, which is to be positioned, supported thereon.

An advantage of this invention is that only a single adjusting means is required to position an object or element in a plurality of different directions in the same plane. Another advantage of this invention is that it utilizes a simplified construction of relatively small size. A further advantage of this invention is that it is easily adjustable. Still another advantage of this invention is that no bearings are required between the various movable elements.

While the invention has been particularly shown and described with reference to a preferred embodiment thereof, it will be understood by those skilled in the art that various changes in form and details may be made therein without departing from the spirit and scope of the invention.

What is claimed is:
1. A positioning apparatus comprising:
  a base;
  support means operatively supported by said base for movement in at least first and second axial directions that are at an angle to each other in the same plane and for rotation about an axis of rotation in a circular direction in the same plane as the axial directions;
  and single means operatively acting on said support means to move said support means in at least the first and second axial directions that are at an angle to each other in the same plane and to rotate said support means about the axis of rotation in the circular direction in the same plane as the axial directions;
2. The apparatus according to claim 1 in which the first and second axial directions intersect each other.
3. The apparatus according to claim 2 in which the axis of rotation passes through the intersection of the first and second axial directions.
4. The apparatus according to claim 1 in which the first and second axial directions are substantially perpendicular to each other.
5. A positioning apparatus comprising:
  a base;
  support means operatively disposed on said base;
  said support means comprising:
    first means mounted on said base for movement relative to said base in a first axial direction;
    and second means mounted on said first means for movement relative to said first means in a second axial direction that is at an angle to the first axial direction;
    one of said first and second means being movable with the other of said first and second means when said other of said first and second means is moved;

and single means acting on only one of said first and second means to move one of said first and second means in at least the first and second axial directions that are at an angle to each other.

6. The apparatus according to claim 5 in which:

said second means is movable with said first means when said first means is movable relative to said base;

and said single means acts on only said second means.

7. The apparatus according to claim 6 including:

means to releasably lock said first means to said base;

and means to releasably lock said second means to said first means.

8. The apparatus according to claim 5 in which the first and second axial directions intersect each other.

9. The apparatus according to claim 8 including:

means to releasably lock said first means to said base;

and means to releasably lock said second means to said first means.

10. A positioning apparatus comprising:

a base;

support means operatively disposed on said base;

said support means comprising:

a first member mounted on said base for movement relative to said base in a first direction;

a second member mounted on said first member for movement relative to said first member in a second direction other than the first direction, said second member being movable with said first member when said first member is moved relative to said base;

and a third member mounted on said second member for movement relative to said second member in a third direction other than the first and second directions, said third member being movable with said second member when said second member is moved relative to said first member and with said first and second members when said first member is moved relative to said base;

and single means acting on only one of said first, second, and third members to move one of said first, second, and third members in the three directions with the three directions including movement in first and second axial directions that are at an angle to each other and rotation about an axis of rotation in a circular direction.

11. The apparatus according to claim 10 in which said single means acts on said third member.

12. The apparatus according to claim 11 including:

means to releasably lock said first member to said base;

means to releasably lock said second member to said first member;

and means to releasably lock said third member to said second member.

13. The apparatus according to claim 10 in which the first and second axial directions intersect each other.

14. The apparatus according to claim 13 in which:

said single means acts on said third member;

means releasably lock said first member to said base;

means releasably lock said second member to said first member;

and means releasably lock said third member to said second member.

References Cited

UNITED STATES PATENTS

| 2,559,966 | 7/1951 | Joseph | 33—189 X |
|---|---|---|---|
| 2,963,941 | 12/1960 | Burnette | 33—56 X |
| 3,165,834 | 1/1965 | Benton | 33—1 |
| 3,396,598 | 8/1968 | Grispo | 269—58 X |
| 3,404,459 | 10/1968 | Redman | 33—1 |

MILTON KAUFMAN, Primary Examiner

U.S. Cl. X.R.

33—174; 269—60

UNITED STATES PATENT OFFICE

CERTIFICATE OF CORRECTION

Patent No. 3,503,272                                         March 31, 1970

Thomas J. Cochran et al.

It is certified that error appears in the above identified patent and that said Letters Patent are hereby corrected as shown below:

Column 1, line 61, "on" should read -- one --. Column 4, line 15, after "17" insert -- and --. Column 6, line 5, "cuase" should read -- cause --; line 56, "semi-colon (;)" should read a period (.). Column 7, line 35, "and" should start a sub-paragraph.

Signed and sealed this 5th day of January 1971.

(SEAL)
Attest:

Edward M. Fletcher, Jr.                            WILLIAM E. SCHUYLER, JR.

Attesting Officer                                        Commissioner of Patents